US009684325B1

(12) United States Patent
Rasmus

(10) Patent No.: US 9,684,325 B1
(45) Date of Patent: Jun. 20, 2017

(54) LOW DROPOUT VOLTAGE REGULATOR WITH IMPROVED POWER SUPPLY REJECTION

(71) Applicant: QUALCOMM Incorporated, San Diego, CA (US)

(72) Inventor: Todd Morgan Rasmus, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/009,600

(22) Filed: Jan. 28, 2016

(51) Int. Cl.
*H02M 3/156* (2006.01)
*G05F 1/575* (2006.01)

(52) U.S. Cl.
CPC .................................... *G05F 1/575* (2013.01)

(58) Field of Classification Search
CPC . G05F 1/56; G05F 1/575; G05F 1/468; G05F 1/562; G05F 1/565; H02M 3/156; H02M 3/158; H02M 3/157; H02M 3/1563
USPC ........ 323/273, 274, 275, 279, 282, 283, 284
See application file for complete search history.

(56) References Cited

U.S. PATENT DOCUMENTS 5,629,609 A * 5/1997 Nguyen .................. G05F 1/575 323/269
6,465,994 B1 10/2002 Xi
7,199,565 B1 * 4/2007 Demolli .................. G05F 1/575 323/273
7,402,985 B2 7/2008 Zlatkovic
7,446,515 B2 11/2008 Wang
8,575,905 B2 11/2013 Bulzacchelli et al.
8,754,620 B2 6/2014 Bansal et al.
9,110,488 B2 8/2015 Hunter et al.
2006/0197513 A1 9/2006 Tang et al.
2006/0273771 A1 * 12/2006 van Ettinger ........... G05F 1/575 323/273
2008/0054867 A1 * 3/2008 Soude ..................... G05F 1/575 323/282
2011/0298499 A1 12/2011 Seol et al.
2014/0253082 A1 * 9/2014 Swanson ............... H02M 3/156 323/284
2015/0130434 A1 5/2015 Jain et al.

FOREIGN PATENT DOCUMENTS

CN 102393781 A 3/2012
CN 104181972 A 12/2014
EP 1191416 A2 3/2002

OTHER PUBLICATIONS

International Search Report and Written Opinion—PCT/U52016/068436—ISA/EPO—Mar. 27, 2017.

* cited by examiner

*Primary Examiner* — Adolf Berhane
(74) *Attorney, Agent, or Firm* — Loza & Loza, LLP/Qualcomm

(57) ABSTRACT

In certain aspects, a method for voltage regulation includes adjusting, using a feedback circuit, a resistance of a first pass element in a direction that reduces a difference between a reference voltage and a feedback voltage, wherein the first pass element is coupled between an input and an output of a voltage regulator, and the feedback voltage is equal to or proportional to a voltage at the output of the voltage regulator. The method also includes adjusting a bias voltage of the feedback circuit in a direction that reduces the difference between the reference voltage and the feedback voltage.

23 Claims, 6 Drawing Sheets

LOW DROPOUT VOLTAGE REGULATOR WITH IMPROVED POWER SUPPLY REJECTION

BACKGROUND

Field

Aspects of the present disclosure relate generally to voltage regulators, and more particularly, to low dropout (LDO) voltage regulators.

Background

Voltage regulators are used in a variety of systems to provide regulated voltages to power circuits in the systems. A commonly used voltage regulator is a low dropout (LDO) voltage regulator. An LDO voltage regulator may be used to provide a steady regulated voltage to power a circuit from a noisy input supply voltage. An LDO voltage regulator typically includes a pass element and an amplifier coupled in a feedback loop to maintain an approximately constant output voltage based on a stable reference voltage.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to an aspect, a voltage regulator is provided. The voltage regulator includes a first pass element coupled between an input and an output of the voltage regulator, wherein the first pass element has a control input for controlling a resistance of the first pass element. The voltage regulator also includes a first feedback circuit having a first input coupled to a reference voltage, a second input coupled to a feedback voltage, and an output coupled to the control input of the first pass element, wherein the feedback voltage is approximately equal to or proportional to a voltage at the output of the voltage regulator, and the first feedback circuit is configured to adjust the resistance of the first pass element in a direction that reduces a difference between the reference voltage and the feedback voltage. The voltage regulator further includes a second feedback circuit having a first input coupled to the reference voltage, a second input coupled to the feedback voltage, and an output coupled to the first feedback circuit, wherein the second feedback circuit is configured to adjust a bias voltage of the first feedback circuit in a direction that reduces the difference between the reference voltage and the feedback voltage.

A second aspect relates to a method for voltage regulation. The method includes adjusting, using a feedback circuit, a resistance of a first pass element in a direction that reduces a difference between a reference voltage and a feedback voltage, wherein the first pass element is coupled between an input and an output of a voltage regulator, and the feedback voltage is equal to or proportional to a voltage at the output of the voltage regulator. The method further includes adjusting a bias voltage of the feedback circuit in a direction that reduces the difference between the reference voltage and the feedback voltage.

A third aspect relates to an apparatus for voltage regulation. The apparatus includes means for adjusting a resistance of a first pass element in a direction that reduces a difference between a reference voltage and a feedback voltage, wherein the first pass element is coupled between an input and an output of a voltage regulator, and the feedback voltage is equal to or proportional to a voltage at the output of the voltage regulator. The apparatus further includes means for adjusting a bias voltage of the means for adjusting the resistance of the first pass element in a direction that reduces the difference between the reference voltage and the feedback voltage.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
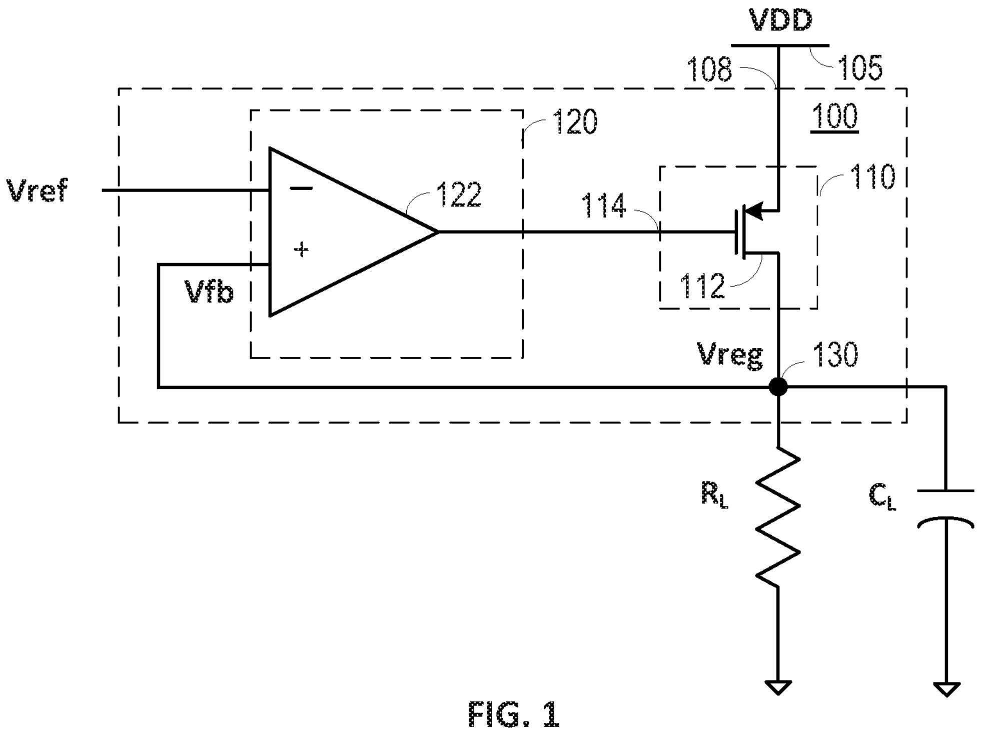
FIG. 1 shows an example of a low dropout (LDO) voltage regulator according to certain aspects of the present disclosure.

FIG. 1 below shows an example of a low dropout (LDO) voltage regulator 100 according to certain aspects of the present disclosure. The LDO voltage regulator 100 includes a pass element 110 and a feedback circuit 120. The pass element 110 is coupled between the input 108 and the output 130 of the LDO voltage regulator 100. The input 108 of the LDO voltage regulator 100 may be coupled to an input supply voltage VDD on a power supply rail 105. The regulated voltage (denoted "Vreg") at the output 130 is approximately equal to VDD minus the voltage drop across the pass element 110. The pass element 110 includes a control input 114 for controlling the resistance of the pass element 110 between the input 108 and the output 130 of the regulator 100.

The output of the feedback circuit 120 is coupled to the control input 114 of the pass element 110 to control the resistance of the pass element 110. By controlling the resistance of the pass element 110, the feedback circuit 120 is able to control the voltage drop across the pass element 110, and hence the regulated voltage Vreg at the output 130 of the regulator 100. As discussed further below, the feedback circuit 120 adjusts the resistance of the pass element 110 based on feedback of the regulated voltage Vreg to maintain the regulated voltage Vreg at approximately a desired voltage.

In the example in FIG. 1, the feedback circuit 120 includes an amplifier 122 (e.g., operational amplifier), and the pass element 110 includes a pass p-type field effect transistor (PFET) 112. In this example, the pass PFET 112 has a source coupled to the input 108 of the LDO voltage regulator 100, a gate coupled to the output of the amplifier 122, and a drain coupled to the output 130 of the LDO voltage regulator 100. The amplifier 122 controls the channel resistance of the pass PFET 112 between the input 108 and the output 130 of the LDO voltage regulator 100 by adjusting the gate voltage of the pass PFET 112. In this example, the amplifier 122 increases the resistance of the pass PFET 112 by increasing the gate voltage, and decreases the resistance of the pass PFET 112 by decreasing the gate voltage. Also, the pass PFET 112 is operated in saturation region.

The output 130 of the LDO voltage regulator 100 is coupled to a resistive load $R_L$ and a capacitive load $C_L$, which may represent the resistive and capacitive loads of a circuit (not shown) coupled to the LDO voltage regulator 100. The regulated voltage (denoted "Vreg") at the output 130 of the LDO voltage regulator 100 is fed back to the feedback circuit 120 via a negative feedback loop to provide the feedback circuit with a feedback voltage ("Vfb"). In this example, the feedback voltage Vfb is approximately equal to the regulated voltage Vreg since the regulated voltage Vreg is fed directly to the feedback circuit 120 in this example. A reference voltage (denoted "Vref") is also input to the feedback circuit 120. The reference voltage Vref may come from a bandgap circuit (not shown) or another stable voltage source. For the example in which the feedback circuit 120 includes the amplifier 122, the feedback voltage Vfb is coupled to a first input (+) of the amplifier 122, the reference voltage Vref is coupled to a second input (−) of the amplifier 122, and the output of the amplifier 122 is coupled to the control input 114 of the pass element 110.

During operation, the feedback circuit 120 drives the control input 114 of the pass element 110 in a direction that reduces the difference (error) between the reference voltage Vref and the feedback voltage Vfb input to the feedback circuit 120. Since the feedback voltage Vfb is approximately equal to the regulated voltage Vreg in this example, the feedback circuit 120 drives the control input 114 of the pass element 110 to force the regulated voltage Vreg to be approximately equal to the reference voltage Vref. For example, if the regulated voltage Vreg (and hence feedback voltage Vfb) increases above the reference voltage Vref, the feedback circuit 120 increases the resistance of the pass element 110, which increases the voltage drop across the pass element 110. The increased voltage drop lowers the regulated voltage Vreg at the output 130, thereby reducing the difference (error) between Vref and Vfb. If the regulated voltage Vreg falls below the reference voltage Vref, the feedback circuit 120 decreases the resistance of the pass element 110, which decreases the voltage drop across the pass element 110. The decreased voltage drop raises the regulated voltage Vreg at the output 130, thereby reducing the difference (error) between Vref and Vreg. Thus, in this example, the feedback circuit 120 dynamically adjusts the resistance of the pass element 110 to maintain an approximately constant regulated voltage Vreg at the output 130 even when the power supply varies (e.g., due to noise) and/or the current load changes.

Figure 2:
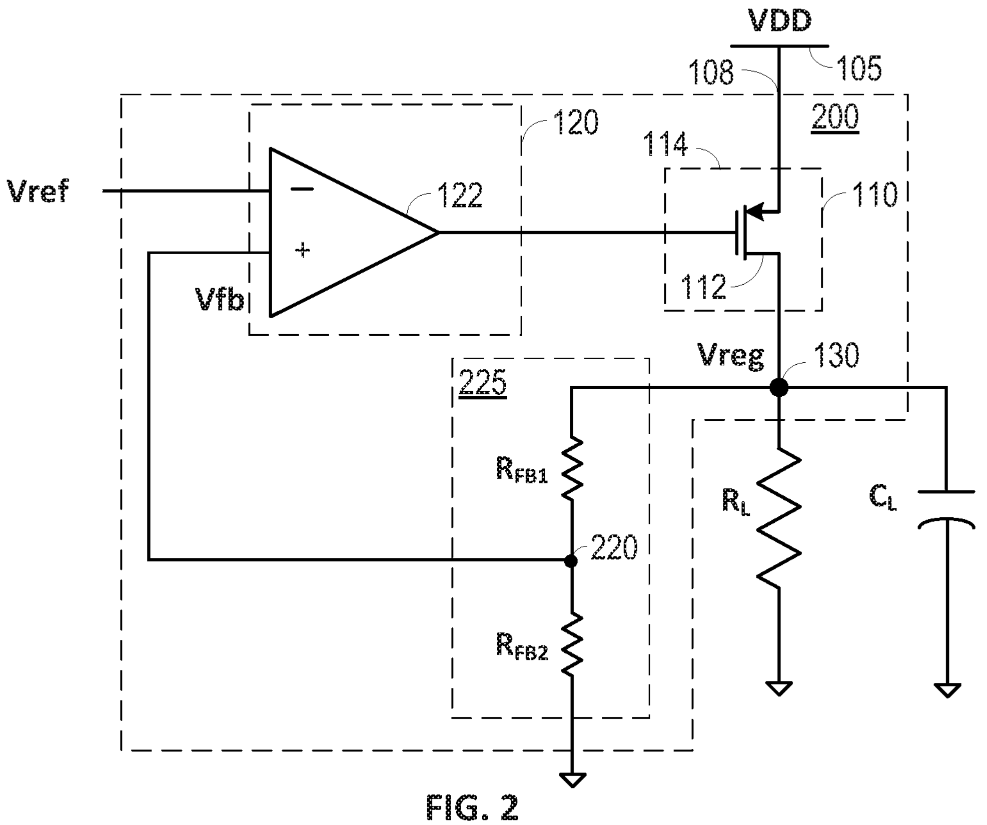
FIG. 2 shows another example of an LDO voltage regulator according to certain aspects of the present disclosure.

In the example in FIG. 1, the regulated voltage Vreg is fed directly to the feedback circuit 120. However, it is to be appreciated that the present disclosure is not limited to this example. For example, FIG. 2 shows another example of a LDO voltage regulator 200, in which the regulated voltage Vref is fed back to the feedback circuit 120 through a voltage divider 225. The voltage divider 225 includes two series resistors $R_{FB1}$ and $R_{FB2}$ coupled to the output 130 of the LDO voltage regulator 200. The voltage at the node 220 between the resistors $R_{FB1}$ and $R_{FB2}$ is fed back to the feedback circuit 120. In this example, the feedback voltage Vfb is related to the regulated voltage Vreg as follows:

$$Vfb = \left(\frac{R_{FB_2}}{R_{FB_1} + R_{FB_2}}\right) \cdot Vreg \tag{1}$$

where $R_{FB1}$ and $R_{FB2}$ in equation (1) are the resistances of resistors $R_{FB1}$ and $R_{FB2}$, respectively. Thus, in this example, the feedback voltage Vfb is proportional to the regulated voltage Vreg, in which the proportionality is set by the ratio of the resistances of resistors $R_{FB1}$ and $R_{FB2}$.

The feedback circuit 120 drives the control input 114 of the pass element 110 in a direction that reduces the difference (error) between the feedback voltage Vfb and reference voltage Vref. This feedback causes the regulated voltage Vreg to be approximately equal to:

$$Vreg = \left(1 + \frac{R_{FB_1}}{R_{FB_2}}\right) \cdot Vref \tag{2}$$

As shown in equation (2), in this example, the regulated voltage may be set to a desired voltage by setting the ratio of the resistances of resistors $R_{FB1}$ and $R_{FB2}$ accordingly. In the present disclosure, it is to be appreciated that the feedback voltage Vfb may be equal to or proportional to the regulated voltage Vreg.

An important measurement of the performance of a LDO voltage regulator 100 or 200 is power supply rejection ratio (PSRR). The PSRR measures the ability of the LDO voltage regulator 100 or 200 to reject noise on the power supply. The greater the PSRR, the greater the noise rejection, and hence the lower the amount of power supply noise that propagates to the output 130 of the LDO voltage regulator.

The PSRR of an LDO voltage regulator 100 or 200 may be increased by increasing the unity gain bandwidth of the LDO voltage regulator. This allows the LDO voltage regulator 100 or 200 to respond faster to transients on the power supply, and therefore reject power supply noise at higher frequencies. However, increasing the unity gain bandwidth can cause instability in the feedback loop of the LDO voltage regulator, as discussed further below.

The feedback loop of the LDO voltage regulator 100 or 200 may have two poles. The first pole may be primarily due the capacitive load $C_L$ and resistance load $R_L$ at the output 130 of the LDO voltage regulator. The second pole may be primarily due to the capacitance at the control input 114 of the pass element 110 and the output impedance of the amplifier 122. Typically, the load capacitance and the capacitance at the control input 114 of the pass element 110 are large. For the example in which the pass element 110 is implemented with the pass PFET 112, the gate capacitance of the pass PFET 112 is typically large. This is because a large pass PFET 112 is typically used to enable the pass PEFT 112 to pass a large load current.

As a result of the large load capacitance and large capacitance at the control input 114 of the pass element 110, the first and second poles are typically located at low frequencies, causing excessive phase shifting in the feedback loop at low frequencies. The excessive phase shifting may approach 180 degrees, causing the feedback loop to become regenerative and therefore unstable.

One approach to improve the stability of the feedback loop is to make the output impedance of the amplifier 122 in the feedback circuit 120 low. The low output impedance pushes the second pole of the feedback loop to higher frequencies, which prevents excessive phase shifting at low frequencies. However, the low output impedance also results in low gain for the amplifier 122. A problem with the low gain is that the low gain can lead to a large gain error in the regulated voltage Vreg, as discussed further below with reference to FIG. 3.

Figure 3:
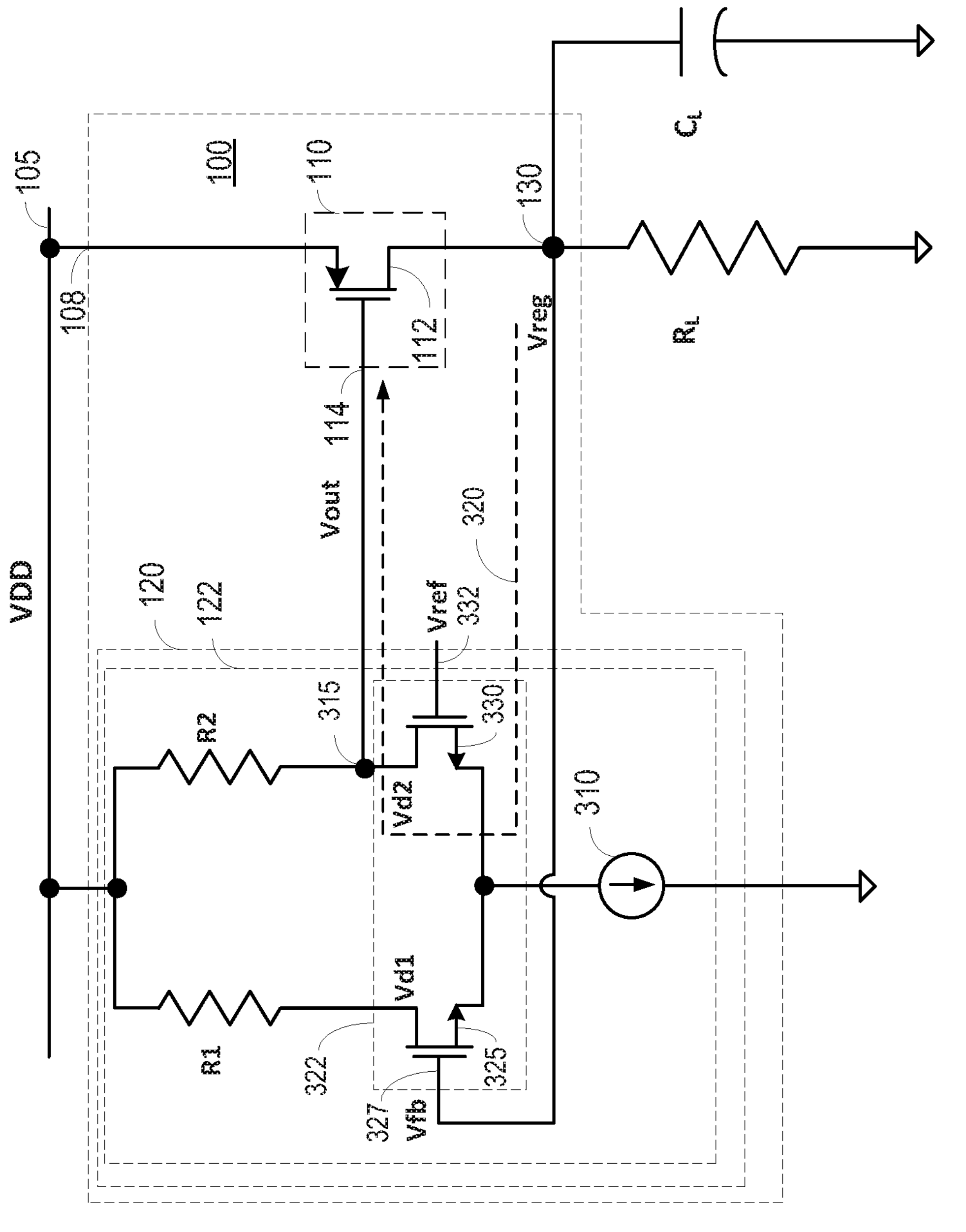
FIG. 3 shows an exemplary implementation of an amplifier in an LDO voltage regulator according to certain aspects of the present disclosure.

FIG. 3 shows an exemplary implementation of the amplifier 122, in which the regulated voltage Vreg is fed directly to the amplifier 122 (i.e., Vfb is approximately equal to Vreg). The amplifier 122 includes a differential driver 322, a first load resistor R1, a second load resistor R2, and a current source 310. In the example in FIG. 3, the differential driver 322 includes a first input n-type field effect transistor (NFET) 325 and a second input NFET 330. The first load resistor R1 is coupled between the power supply rail 105 and the drain of the first input NFET 325, and the second load resistor R2 is coupled between the power supply rail 105 and the drain of the second input NEFT 330. The current source 310 is coupled to the sources of the first and second input NFETs 325 and 330 and provides a bias current for the amplifier 122.

In this example, the feedback voltage Vfb is input to a first input 327 of the differential driver 322 corresponding to the gate of the first input NFET 325. The reference voltage Vref is input to a second input 332 of the differential driver 322 corresponding to the gate of the second input NFET 330. The output of the amplifier 122 is taken at the node 315 between the second load resistor R2 and the drain of the second input NEFT 330, as shown in FIG. 3.

In this example, the resistance of load resistor R2 may be made low to provide the amplifier 122 with low output impedance and high bandwidth. As discussed above, the low output impedance pushes the second pole of the feedback loop 320 to higher frequency, improving the stability of the feedback loop 320. The low output impedance also lowers the gain of the amplifier 122. This is because open-loop gain of the amplifier 122 is the product of the output impedance and the transconductance of the amplifier 122. The low gain results in a large gain error in the regulated voltage Vreg, as explained further below.

During operation, the bias current of the current source 310 is usually not split evenly between the first and second load resistors R1 and R2 (i.e., the currents flowing through the load resistors are not balanced). The current through the second load resistor R2 is approximately equal to:

$$I2 = \frac{VDD - Vout}{R2} \quad (3)$$

where I2 is the current through the second load resistor R2, Vout is the output voltage of the amplifier 122, and R2 in equation (3) is the resistance of the second load resistor R2. The current through the first load resistor R1 is given by:

$$I1 = Ibias - I2 \quad (4)$$

where I1 is the current through the first load resistor R1 and Ibias is the bias current of the current source 310. In the example in FIG. 3, the feedback loop 320 adjusts the output voltage Vout of the amplifier 122 (which drives the control input 114 of the pass element 110) in a direction that reduces the difference between Vref and Vfb. Usually, this results in the current I2 through the second load resistor R2 being different than the current I1 through the first load resistor R1.

The different currents I1 and I2 through the load resistors R1 and R2 cause the voltage drops across the load resistors R1 and R2 to be different (assuming the resistances of the load resistors R1 and R2 are approximately equal). This, in turn, causes the drain voltage Vd1 of the first input NFET 325 to differ from the drain voltage Vd2 of the second input NFET 330. The difference in the drain voltages leads to an input-referred voltage offset given by the difference between Vd1 and Vd2 divided by the gain of the amplifier 122. Since the gain of the amplifier 122 is low, the input-referred voltage offset of the amplifier 122 is relatively high. The high input-referred voltage offset results in a relatively large gain error between Vref and Vfb, which are the input voltages to the amplifier 122.

Thus, the low gain of the amplifier 122 results in a large gain error between Vreg and Vfb. The feedback loop 320 of the LDO regulator 100 is not effective at correcting the gain error between Vreg and Vfb. This is because the feedback loop 320 drives the control input 114 of the pass element 110 so that the difference between Vreg and Vfb is approximately equal to the input-referred voltage offset while the difference should ideally be zero volts. The input-referred voltage offset (and hence gain error between Vref and Vfb) may be reduced by increasing the output impedance (and hence gain) of the amplifier 122. However, it is desirable to keep the output impedance of the amplifier 122 low to provide stability of the feedback loop 320, as discussed above. Accordingly, there is a need for methods and systems that reduce the gain error while keeping the output impedance of the amplifier 122 low.

Embodiments of the present disclosure reduce the gain error discussed above by providing the LDO voltage regulator with a second feedback loop that reduces the gain error, as discussed further below.

Figure 4:
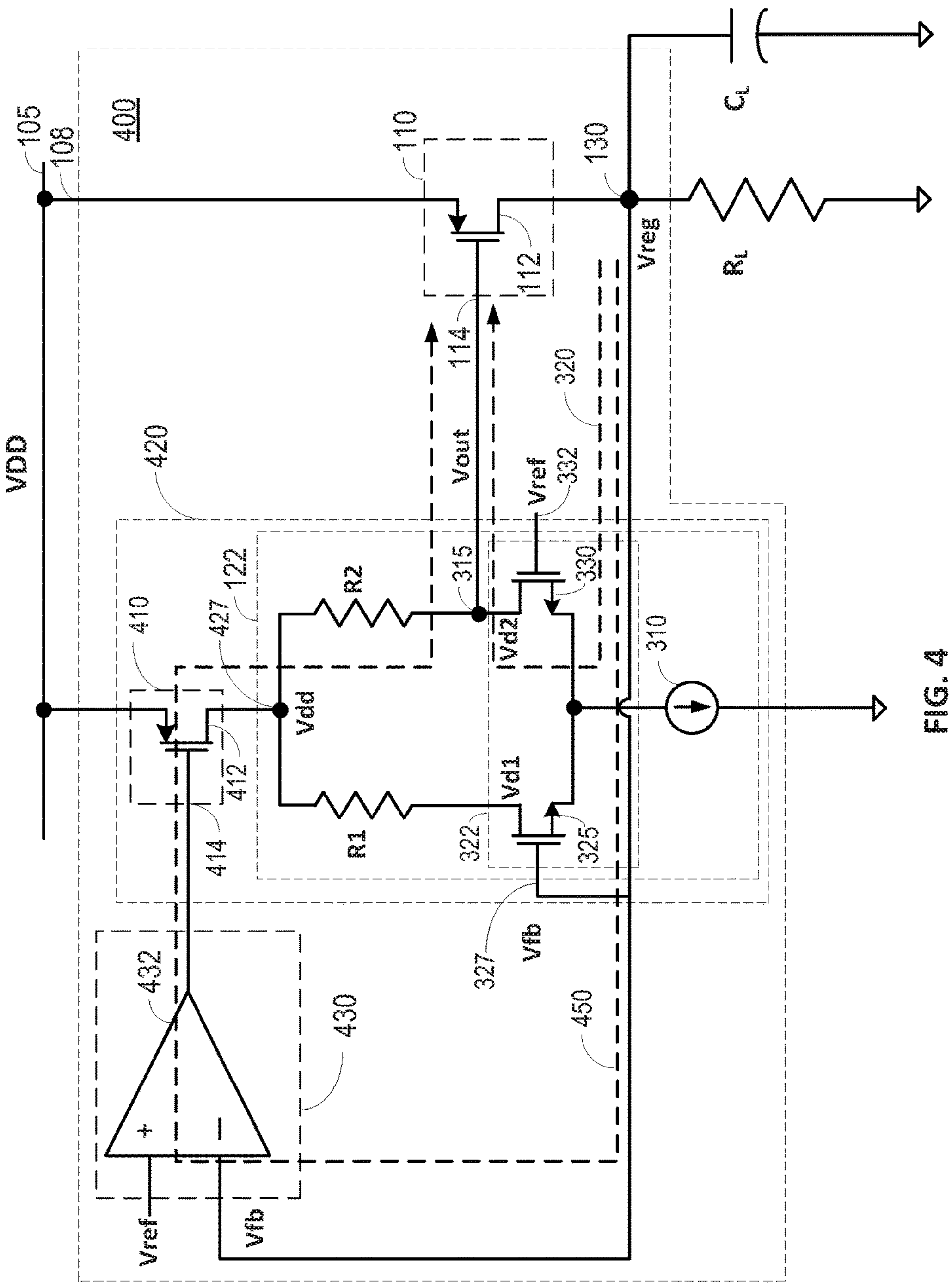
FIG. 4 shows an example of an LDO voltage regulator including first and second feedback circuits according to certain aspects of the present disclosure.

FIG. 4 shows a LDO voltage regulator 400 according to certain aspects of the present disclosure. The LDO voltage regulator 400 includes the pass element 110 shown in FIG. 3. In the discussion below, the pass element 110 is referred to as the first pass element 110 to distinguish this pass element from another pass element in the LDO voltage regulator 400, which is described further below.

The LDO voltage regulator 400 also includes a first feedback circuit 420. The first feedback circuit 420 includes the amplifier 122 shown in FIG. 3, and a second pass element 410. In the discussion below, the amplifier 122 is referred to as the first amplifier 122 to distinguish this amplifier from another amplifier in the LDO voltage regulator 400, which is described further below. In the example in FIG. 4, the first amplifier 122 has a first input 327 coupled to the feedback voltage Vfb, a second input 332 coupled to the reference voltage Vref, and an output 315 coupled to the control input 114 of the first pass element 110, similar to the amplifier 122 in FIG. 3. In certain aspects, the first amplifier 122 has low gain and high bandwidth to allow the first feedback circuit 420 to respond to fast transients on the power supply rail 105 and fast changes in the current load to maintain a steady regulated voltage Vreg. This allows the first feedback circuit 420 to quickly adjust the resistance of the first pass element 110 in a direction that reduces the difference Vreg and Vfb resulting from fast transients on the power supply and/or fast changes in the load current. However, the first feedback circuit 420 may also have a high gain error due to the low gain of the first amplifier 122, as discussed above.

The second pass element 410 is coupled between the power supply rail 105 and a bias node 427 of the first amplifier 122. The bias node 427 may be coupled to the load resistors R1 and R2 of the first amplifier 122, as shown in FIG. 4. Thus, in this example, the load resistors R1 and R2 are coupled to the power supply rail 105 through the second pass element 410 instead being of directly coupled to the power supply 105, as was the case in FIG. 3.

As a result, the bias voltage (denoted "Vdd") at the bias node 427 of the first feedback circuit 420 is approximately equal to VDD minus the voltage drop across the second pass element 410. The second pass element 410 includes a control input 414 for controlling the resistance of the second pass element 410. Since the resistance of the second pass element 410 controls the voltage drop across the second pass element 410, the bias voltage at the bias node 427 may be adjusted by adjusting the resistance of the second pass element 410. The current through the second pass element 410 may be approximately equal to the bias current of the current source 310 and approximately constant as the resistance of the second pass element 410 is adjusted by the second feedback circuit 430. It is to be appreciated that the second pass element 410 may be much smaller than the first pass element 110 since the second pass element 410 does not need to pass a large load current.

The LDO voltage regulator 400 also includes a second feedback circuit 430. In the example in FIG. 4, the second feedback circuit 430 includes a second amplifier 432 having a first input (+) coupled to the reference voltage Vref, a second input (−) coupled to the feedback voltage Vfb, and an output coupled to the control input 414 of the second pass element 410. In the example in FIG. 4, the regulated voltage Vreg is fed directly to the second input (−) of the second amplifier 432. Thus, in this example, the feedback voltage Vfb at the second input (−) of the second amplifier 432 is approximately equal to Vreg. The output of the second amplifier 432 controls the resistance of the second pass element 410 via the control input 414, which in turn controls the voltage drop across the second pass element 410, and hence the bias voltage Vdd at the bias node 427 of the first feedback circuit 420. This allows the second amplifier 432 to adjust the bias voltage Vdd at the bias node 427 of the first feedback circuit 420. As discussed further below, the second amplifier 432 adjusts the bias voltage Vdd of the first feedback circuit 420 based on feedback of the regulated voltage Vreg to correct the gain error of the first feedback circuit 420.

The second pass element 410 may include a second pass PFET 412, as shown in the example in FIG. 4. In this example, the second pass PFET 412 has a source coupled to the power supply rail 105, a gate coupled to the output of the second amplifier 432, and a drain coupled to the bias node 427 of the first feedback circuit 420. The second amplifier 432 controls the channel resistance of the second pass PFET 412 (and hence the bias voltage Vdd) by adjusting the gate voltage of the second pass PFET 412. In this example, the second amplifier 432 increases the resistance of the second pass PFET 412 (and hence reduces the bias voltage Vdd) by increasing the gate voltage. The second amplifier 432 decreases the resistance of the second pass PFET 412 (and hence increases the bias voltage Vdd) by decreasing the gate voltage. Also, the second pass PFET 412 is operated in saturation region.

During operation, the second feedback circuit 430 drives the control input 414 of the second pass element 410 in a direction that reduces the difference between the reference voltage Vref and the feedback voltage Vfb resulting from the gain error of the first feedback circuit 420. The second feedback circuit 430 does this by adjusting the bias voltage Vdd via the second pass element 410 in a direction that balances the currents flowing through the first and second load resistors R1 and R2 of the first amplifier 122. As a result, the voltage drops across the load resistors R1 and R2 are approximately equal, causing the drain voltages Vd1 and Vd2 of the first and second input NFETs 325 and 330 to be approximately equal. This reduces the difference between Vd1 and Vd2, thereby reducing the input-referred voltage offset of the first amplifier 120, and hence the gain error of the first feedback circuit 420.

For example, if the current through the second load resistor R2 is greater than the current through the first load resistor R1, the second feedback circuit 430 decreases the bias voltage Vdd at the bias node 427 by increasing the resistance of the second pass element 410. The decrease in the bias voltage Vdd reduces the voltage drop across the second load resistor R2, which is approximately equal to Vdd-Vout. The reduction in the voltage drop causes the current through the second load resistor R2 to decrease. As a result, more of the bias current of the current source 310 is steered to the first load resistor R1. This increases the current through the first load resistor R1, thereby reducing the difference between the currents through the first and second load resistors R1 and R2.

As discussed above, the second amplifier 432 of the second feedback circuit 430 has high gain and low bandwidth, and therefore much lower gain error than the first amplifier 122 of the first feedback circuit 420. This allows the second feedback circuit 430 to reduce the difference between Vref and Vfb resulting from the gain error of the first feedback circuit 420 while having little to no impact on the fast transient response of the first feedback circuit 420.

Thus, the first feedback circuit 420 of the LDO voltage regulator 400 has low gain and high bandwidth for responding to fast transients on the power supply and fast changes in the current load. The second feedback circuit 430 of the LDO voltage regulator 400 has high gain and low bandwidth for correcting the gain error of the first feedback circuit 420, where the gain error is due to the low gain of the first feedback circuit 420. In FIG. 4, the feedback loop of the first feedback circuit 420 is shown by the dashed line labeled 320, and the feedback loop of the second feedback circuit 430 is shown by the dashed line labeled 450.

In certain aspects, the LDO voltage regulator 400 can respond to fast transients on the power supply that are within the unity bandwidth of the first feedback circuit 420 (i.e., frequency range for which the open loop gain exceeds 0 dB (unity gain)). For example, the first feedback circuit 420 may have a unity gain of 100 MHz or higher. Thus, in this example, the LDO voltage regulator 400 can respond to fast transients within a frequency range of 100 MHz or higher. In certain aspects, the first feedback circuit 420 may respond to fast current load changes of 20% of a rated maximum load in a time of 100 pS to 500 pS. It is to be appreciated that embodiments of the present disclosure are not limited to the above examples.

It is to be appreciated that embodiments of the present disclosure are not limited to the exemplary implementation of the first amplifier 122 shown in FIG. 4. Embodiments of the present disclosure may be used to correct gain error from other amplifiers having low gain. Further, although FIG. 4 shows an example in which the regulated voltage Vreg is fed back directly to the first and second feedback circuits 420 and 430, it is to be appreciated that the present disclosure is not limited to this example. For instance, the regulated voltage Vreg may be fed back to the first and second feedback circuits 420 through a voltage divider (e.g., voltage divider 225), in which case, the feedback voltage Vfb may be proportional to the regulated voltage Vreg.

Figure 5:
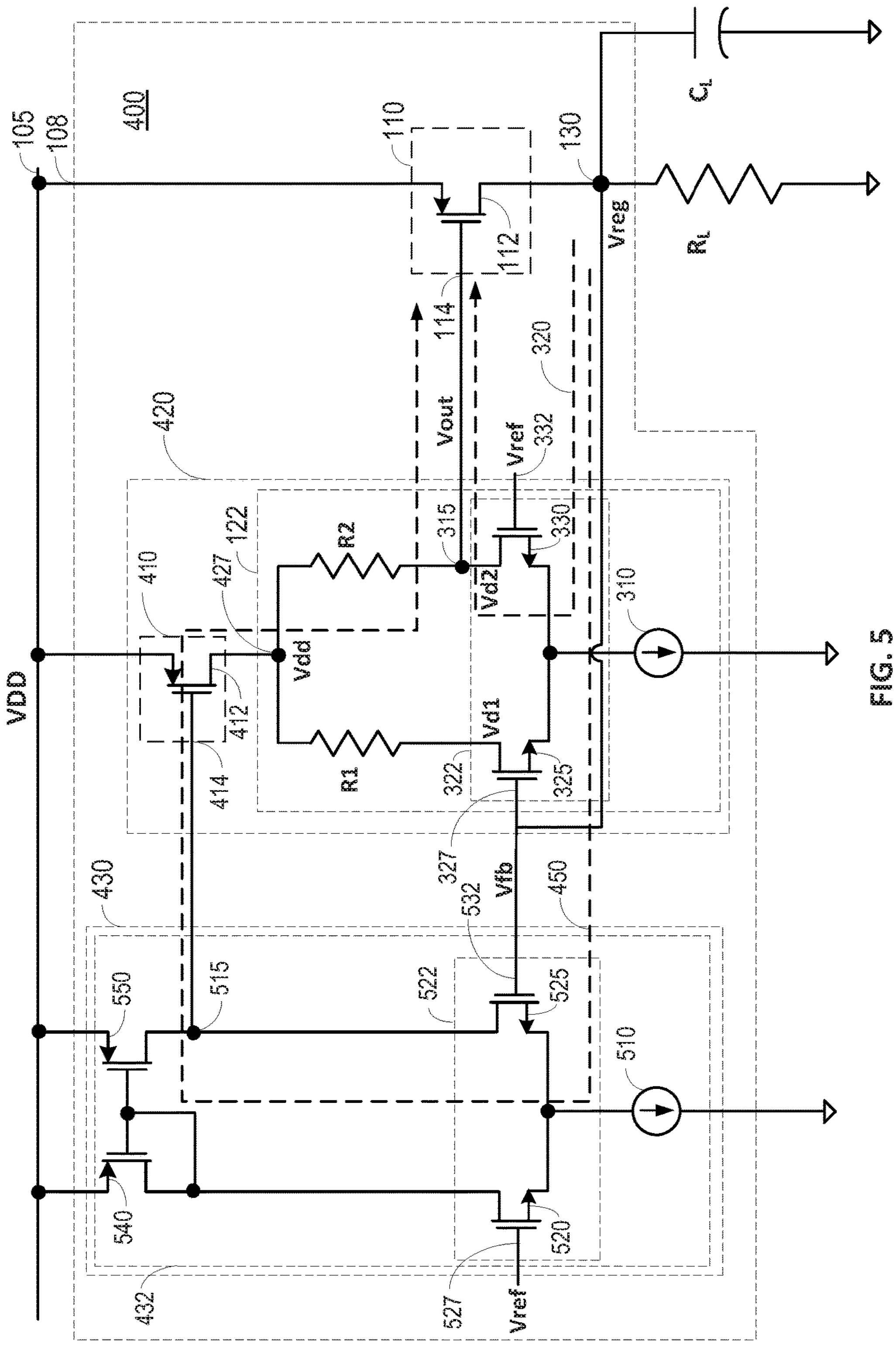
FIG. 5 shows an exemplary implementation of an amplifier in the second feedback circuit according to certain aspects of the present disclosure.

FIG. 5 shows an exemplary implementation of the second amplifier 432 according to certain aspects of the present disclosure. In this example, the second amplifier 432 includes a differential driver 522, a first PFET 540, a second PFET 550, and a current source 510. In the example in FIG. 5, the differential driver 522 includes first and second input NFETs 520 and 525.

In this example, the reference voltage Vref is input to a first input 527 of the differential driver 522 corresponding to the gate of the first input NFET 520. The feedback voltage Vfb is input to a second input 532 of the differential driver 522 corresponding to the gate of the second input NFET 525. The output of the second amplifier 432 is taken at the node 515 between the drain of the second PFET 550 and the drain of the second NFET 525, as shown in FIG. 5.

The first PFET 540 has a source coupled to the power supply rail 105 and a drain coupled to the drain of the first input NFET 520. The gate and drain of the first PFET 540 are tied together. The second PFET 550 has a source coupled to the power supply rail 105, a gate coupled to the gate of the first PFET 540, and a drain coupled to the drain of the second input NFET 525. As discussed further below, the second PFET 550 provides a high-impedance active load at the output 515 of the second amplifier 432. The current source 510 is coupled to the sources of the first and second input NFETs 520 and 525 and provides a bias current for second the amplifier 432.

In this example, the impedance looking into the drain of the second PFET 550 at the output 515 of the second amplifier 432 is high relative to the output impedance of the first amplifier 122. The high impedance provides the second amplifier 432 with much higher gain than the first amplifier 122. This high gain allows the second feedback circuit 430 to correct the gain error of the first feedback circuit 420, as discussed above.

Figure 6:
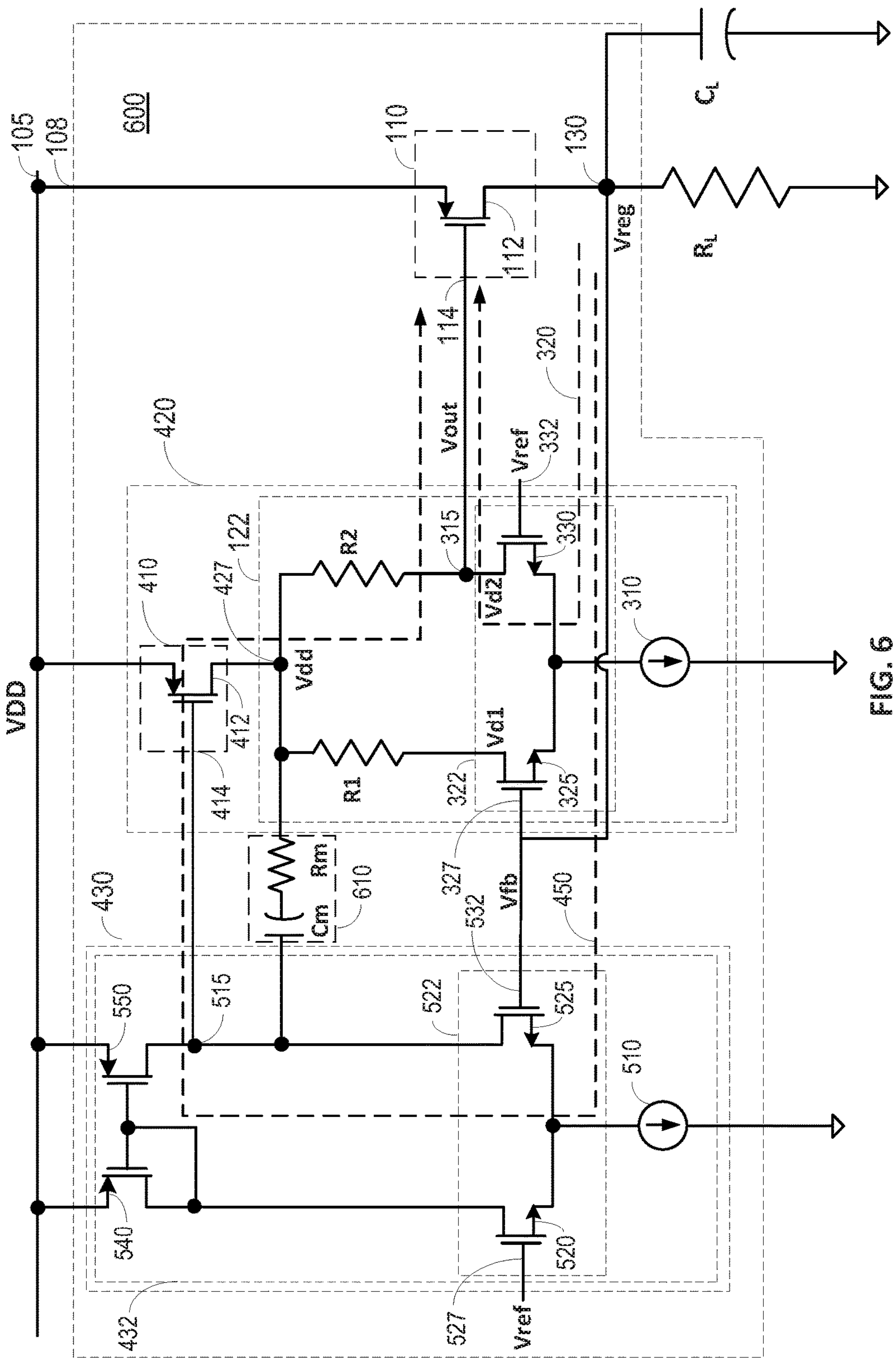
FIG. 6 shows an exemplary resistor-capacitor (RC) network to reduce a bandwidth of the second feedback circuit according to certain aspects of the present disclosure.

FIG. 6 shows an LDO voltage regulator 600 according to certain aspects of the present disclosure. The LDO voltage regulator 600 is similar to the LDO voltage regulator 400 in FIG. 5 and further includes a resistor-capacitor (RC) network 610 coupled between the first feedback circuit 420 and the second feedback circuit 432. In the example in FIG. 6, the RC network 610 includes a capacitor Cm and a resistor Rm coupled in series. The RC network 610 is configured to reduce the bandwidth of the second feedback circuit 430 by increasing the RC time constant at the output of the second feedback circuit 430. In this example, the bandwidth of the second feedback circuit 430 may be reduced to prevent the second feedback circuit 430 from interfering with operation of the first feedback circuit 420 at high frequencies.

In the example in FIG. 6, the capacitor Cm is coupled between the gate and drain of the second pass PFET 412. This increases the equivalent capacitance of the capacitor Cm through the Miller effect, which allows the physical size of the capacitor Cm to be reduced.

Figure 7:
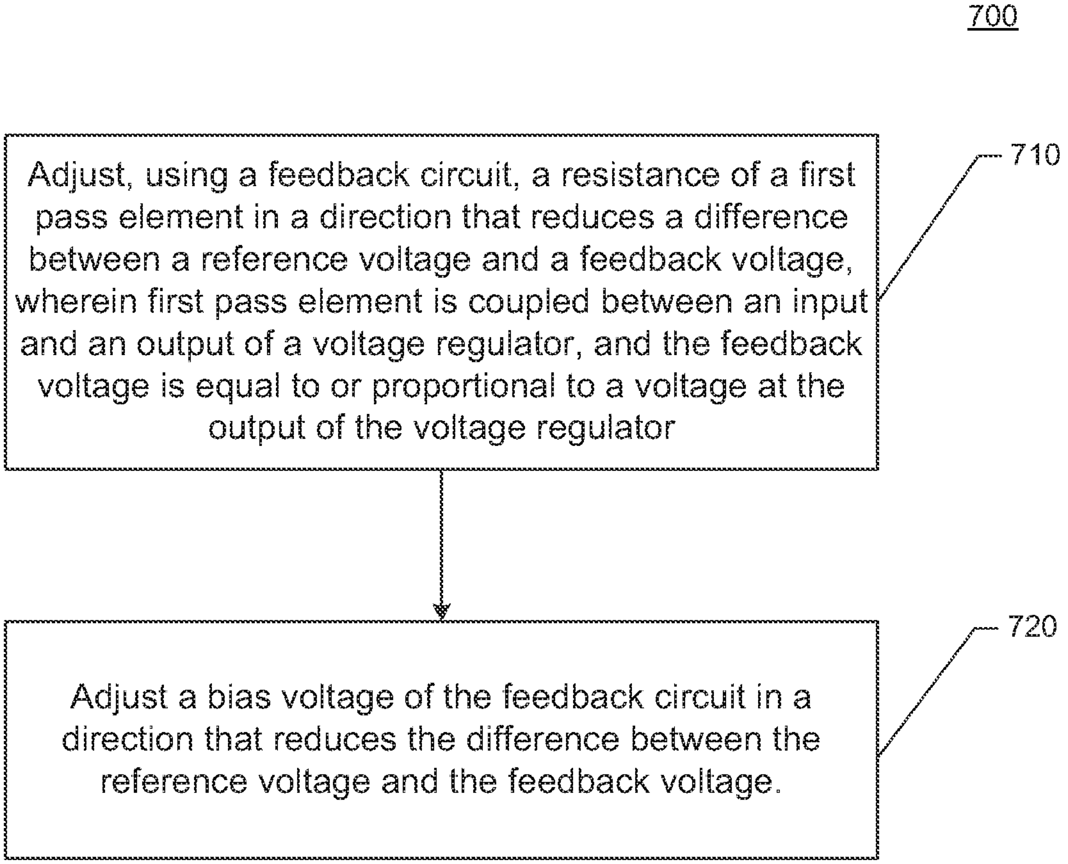
FIG. 7 is a flowchart showing a method for voltage regulation according to certain aspects of the present disclosure.

FIG. 7 is a flowchart showing an exemplary method 700 for voltage regulation according to certain aspects of the present disclosure. The method may be performed by the LDO voltage regulator 400 or 600.

In step 710, a resistance of a first pass element is adjusted using a feedback circuit in a direction that reduces a difference between a reference voltage and a feedback voltage, wherein first pass element is coupled between an input and an output of a voltage regulator, and the feedback voltage is equal to or proportional to a voltage at the output of the voltage regulator. For example, the first pass element may include the first pass element 410 in FIGS. 4-6.

In step 720, a bias voltage of the feedback circuit is adjusted in a direction that reduces the difference between the reference voltage and the feedback voltage. For example, the feedback circuit may include a pass element (e.g., second pass element 410) and an amplifier (e.g., first amplifier 122), in which the bias voltage (e.g., Vdd) is between the pass element and the amplifier, and the bias voltage is adjusted by adjusting a resistance of the pass element.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A voltage regulator, comprising:

a first pass element coupled between a power supply rail and an output of the voltage regulator, wherein the first pass element has a control input for controlling a resistance of the first pass element;

a first feedback circuit comprising:

a first amplifier having a first input coupled to a reference voltage, a second input coupled to a feedback voltage, and an output coupled to the control input of the first pass element, wherein the feedback voltage is approximately equal to or proportional to a voltage at the output of the voltage regulator, and the first amplifier is configured to adjust the resistance of the first pass element in a direction that reduces a difference between the reference voltage and the feedback voltage; and a second pass element, wherein the second pass element is coupled between the power supply rail and the first amplifier, the second pass element has a control input for controlling a resistance of the second pass element, and the first feedback circuit has a bias voltage between the second pass element and the first amplifier; and a second feedback circuit having a first input coupled to the reference voltage, a second input coupled to the feedback voltage, and an output coupled to the control input of the second pass element, wherein the second feedback circuit is configured to adjust the bias voltage of the first feedback circuit in a direction that reduces the difference between the reference voltage and the feedback voltage by adjusting the resistance of the second pass element.

2. The voltage regulator of claim 1, wherein the first feedback circuit is configured to reduce the difference between the reference voltage and the feedback voltage resulting from fast transients on the power supply rail.

3. The voltage regulator of claim 1, wherein the first feedback circuit is configured to reduce the difference between the reference voltage and the feedback voltage resulting from fast changes in a load coupled to the output of the voltage regulator.

4. The voltage regulator of claim 1, wherein the second feedback circuit is configured to reduce the difference between the reference voltage and the feedback voltage resulting from a gain error of the first amplifier.

5. The voltage regulator of claim 1, wherein a current through the second pass element stays approximately constant as the resistance of the second pass element is adjusted.

6. The voltage regulator of claim 1, wherein the second pass element comprises a p-type field effect transistor (PFET) having a source coupled to the power supply rail, a gate coupled to the output of the second feedback circuit, and a drain coupled to the first amplifier.

7. The voltage regulator of claim 1, wherein the first amplifier comprises:

a differential driver;

a first load coupled between the second pass element and a first output of the differential driver; and a second load coupled between the second pass element and a second output of the differential driver, wherein the differential driver is configured to drive the first and second loads based on the reference voltage and the feedback voltage.

8. The voltage regulator of claim 7, wherein the second feedback circuit is configured to adjust the resistance of the second pass element in a direction that reduces a difference between a current through the first load and a current through the second load.

9. The voltage regulator of claim 7, wherein the first amplifier further comprises a current source configured to provide a bias current for the first amplifier, and a current through the second pass element is approximately equal to the bias current.

10. The voltage regulator of claim 4, wherein the second feedback circuit comprises a second amplifier having a first input coupled to the reference voltage, a second input coupled to the feedback voltage, and an output coupled to the first feedback circuit, and wherein the first amplifier is a low gain, high bandwidth amplifier, and the second amplifier is a high gain, low bandwidth amplifier.

11. The voltage regulator of claim 10, further comprising a capacitor having a first end coupled between the second pass element and the first amplifier, and a second end coupled to the output of the second amplifier.

12. The voltage regulator of claim 1, wherein the second pass element provides power from the power supply rail to the first amplifier by passing a current from the power supply rail to the first amplifier.

13. A method for voltage regulation, comprising:

adjusting, using a feedback circuit, a resistance of a first pass element in a direction that reduces a difference between a reference voltage and a feedback voltage, wherein the first pass element is coupled between a power supply rail and an output of a voltage regulator, and the feedback voltage is equal to or proportional to a voltage at the output of the voltage regulator; and adjusting a bias voltage of the feedback circuit in a direction that reduces the difference between the reference voltage and the feedback voltage, wherein the first feedback circuit comprises an amplifier and a second pass element coupled between the power supply rail and the amplifier, the bias voltage of the feedback circuit is between the second pass element and the amplifier, and adjusting the bias voltage further comprises adjusting a resistance of the second pass element.

14. The method of claim 13, wherein adjusting the resistance of the first pass element reduces the difference between the reference voltage and the feedback voltage resulting from fast transients at the input of the voltage regulator.

15. The method of claim 13, wherein adjusting the resistance of the first pass element reduces the difference between the reference voltage and the feedback voltage resulting from fast changes in a load coupled to the output of the voltage regulator.

16. The method of claim 13, wherein adjusting the bias voltage of the feedback circuit reduces the difference between the reference voltage and the feedback voltage resulting from a gain error of the amplifier.

17. The method of claim 13, wherein a current through the second pass element stays approximately constant as the resistance of the second pass element is adjusted.

18. The method of claim 13, wherein the amplifier comprises first and second loads, and adjusting the resistance of the second pass element comprises adjusting the resistance of the second pass element in a direction that reduces a difference between a current through the first load and a current through the second load.

19. An apparatus for voltage regulation, comprising:

means for adjusting a resistance of a first pass element in a direction that reduces a difference between a reference voltage and a feedback voltage, wherein the first pass element is coupled between a power supply rail and an output of a voltage regulator, the feedback voltage is equal to or proportional to a voltage at the output of the voltage regulator, and wherein the means for adjusting comprises an amplifier and a second pass element coupled between the power supply rail and the amplifier, and the second pass element has a control input for controlling a resistance of the second pass element; and means for adjusting a bias voltage of the means for adjusting the resistance of the first pass element in a direction that reduces the difference between the reference voltage and the feedback voltage, wherein the means for adjusting the bias voltage comprises means for adjust the resistance of the second pass element.

20. The apparatus of claim 19, wherein the means for adjusting the resistance of the first pass element reduces the difference between the reference voltage and the feedback voltage resulting from fast transients at the input of the voltage regulator.

21. The apparatus of claim 19, wherein the means for adjusting the resistance of the first pass element reduces the difference between the reference voltage and the feedback voltage resulting from fast changes in a load coupled to the output of the voltage regulator.

22. The apparatus of claim 19, wherein the means for adjusting the bias voltage reduces the difference between the reference voltage and the feedback voltage resulting from a gain error of the amplifier.

23. The apparatus of claim 22, wherein the amplifier comprises first and second loads, and the means for adjusting the bias voltage adjusts the bias voltage in a direction that reduces a difference between a current through the first load and a current through the second load.

* * * * *